United States Patent
Bassey

(10) Patent No.: US 12,445,766 B1
(45) Date of Patent: Oct. 14, 2025

(54) AUDIO RECORDING AND PLAYBACK KEYCHAIN

(71) Applicant: Scholastica Bassey, Abingdon, MD (US)

(72) Inventor: Scholastica Bassey, Abingdon, MD (US)

( * ) Notice: Subject to any disclaimer, the term of this patent is extended or adjusted under 35 U.S.C. 154(b) by 198 days.

(21) Appl. No.: 18/239,178

(22) Filed: Aug. 29, 2023

(51) Int. Cl.
  *H04R 1/34* (2006.01)
  *A44B 15/00* (2006.01)

(52) U.S. Cl.
  CPC ............. *H04R 1/345* (2013.01); *A44B 15/00* (2013.01)

(58) Field of Classification Search
  CPC ................................ H04R 1/345; A44B 15/00
  USPC ........................................................ 381/386
  See application file for complete search history.

(56) References Cited

U.S. PATENT DOCUMENTS

| | | | |
|---|---|---|---|
| D370,339 S | 6/1996 | Pinchuk | |
| 6,587,052 B1 | 7/2003 | Flick | |
| 6,687,675 B1 | 2/2004 | Archambeau | |
| 9,614,953 B1 | 4/2017 | Bakhoum | |
| 9,934,817 B2 | 4/2018 | O+3 Shields | |
| 2005/0024346 A1 | 2/2005 | Dupraz | |
| 2007/0030121 A1 | 2/2007 | Soliz | |
| 2010/0099330 A1 | 4/2010 | Digiovanni | |
| 2021/0170297 A1* | 6/2021 | Mascia | G06V 40/172 |

FOREIGN PATENT DOCUMENTS

WO  2015051227  4/2015

* cited by examiner

*Primary Examiner* — Sean H Nguyen

(57) ABSTRACT

The audio recording and playback keychain is a therapeutic device. The audio recording and playback keychain is maintained in the custody of the end user. The audio recording and playback keychain offers the end user audibly accessible messages of encouragement in times of the end user's need. The audio recording and playback keychain includes a control circuit, a power circuit, and a personal data device. The control circuit stores and presents the audibly accessible messages for the end user's use. The personal data device forms a wireless communication link with the control circuit. The personal data device forms an interface between the control circuit and an appropriate authority.

8 Claims, 5 Drawing Sheets

100

AUDIO RECORDING AND PLAYBACK KEYCHAIN

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of information capture and storage. (G11B00)

SUMMARY OF INVENTION

The audio recording and playback keychain is a therapeutic device. The audio recording and playback keychain is adapted for use with an end user. The audio recording and playback keychain is an electronic device. The audio recording and playback keychain is maintained in the custody of the end user. The audio recording and playback keychain offers the end user audibly accessible messages of encouragement in times of the end user's need. The audio recording and playback keychain comprises a control circuit, a power circuit, and a personal data device. The control circuit stores and presents the 23 audibly accessible messages for the end user's use. The 24 personal data device forms a wireless communication link with the control circuit. The personal data device forms an interface between the control circuit and an appropriate authority.

These together with additional objects, features and advantages of the audio recording and playback keychain will be readily apparent to those of ordinary skill in the art upon reading the following detailed description of the presently preferred, but nonetheless illustrative, embodiments when taken in conjunction with the accompanying drawings.

In this respect, before explaining the current embodiments of the audio recording and playback keychain in detail, it is to be understood that the audio recording and playback keychain is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the audio recording and playback keychain.

It is therefore important that the claims be regarded as including such equivalent construction insofar as they do not depart from the spirit and scope of the audio recording and playback keychain. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
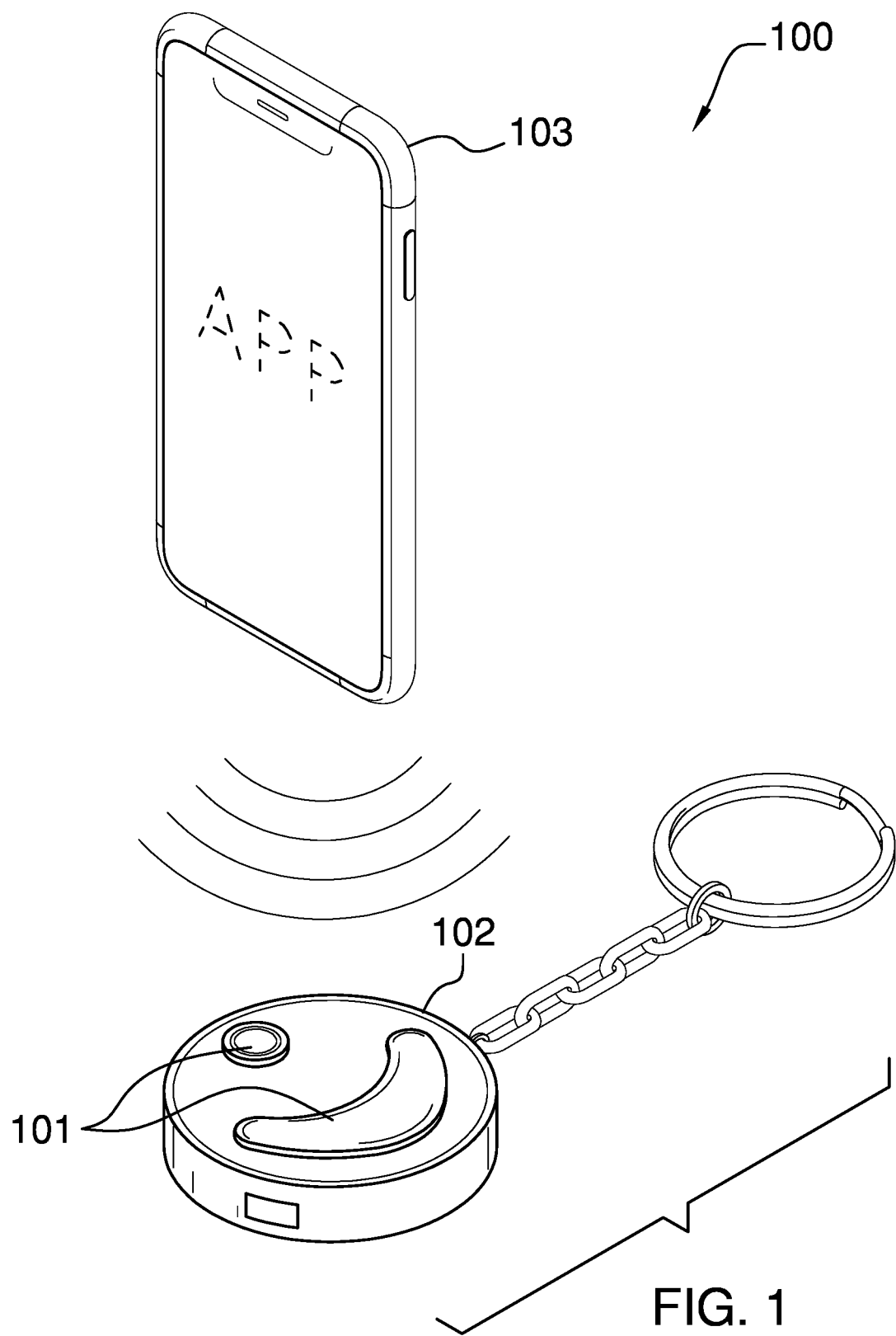
FIG. 1 is a perspective view of an embodiment of the disclosure.
Figure 2:
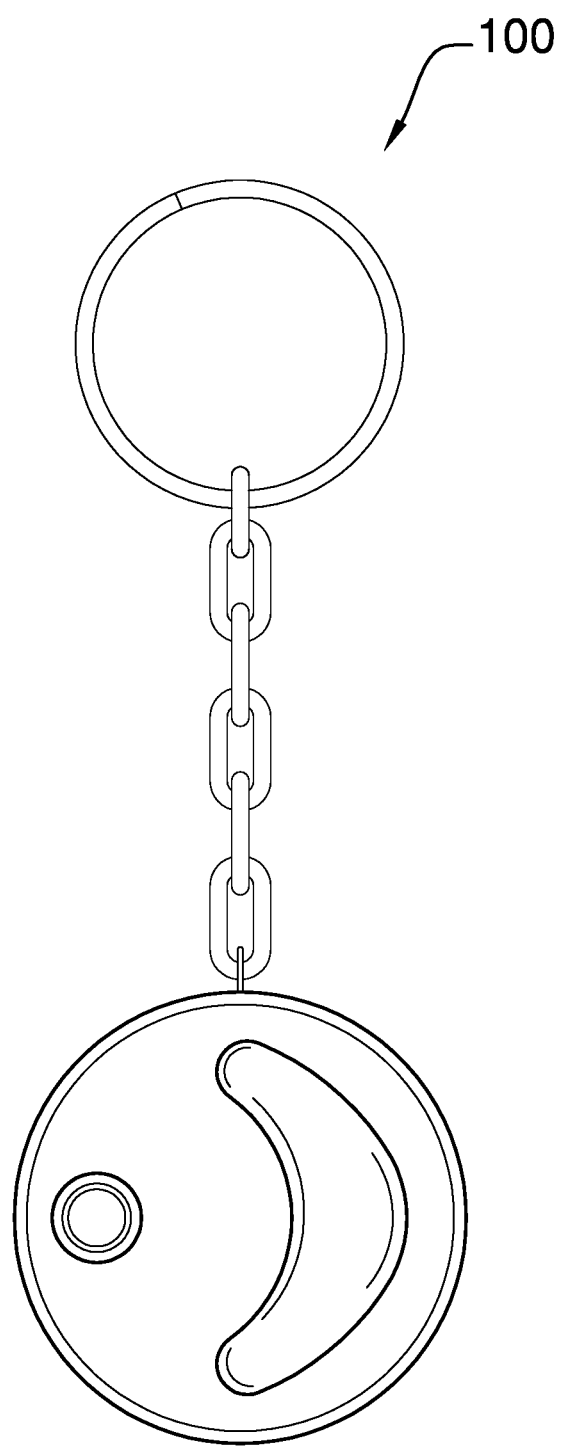
FIG. 2 is a front view of an embodiment of the disclosure.
Figure 3:
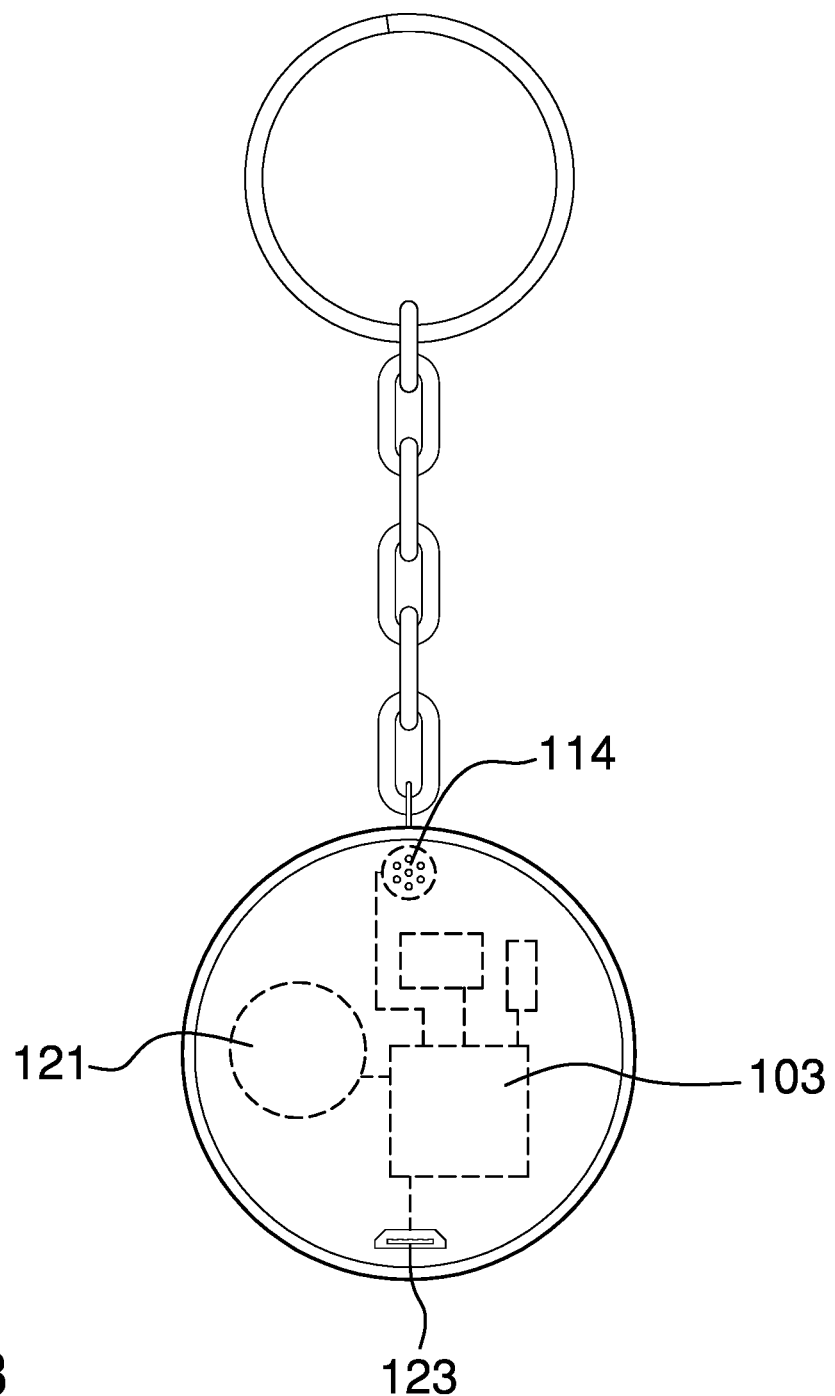
FIG. 3 is a rear view of an embodiment of the disclosure.
Figure 4:
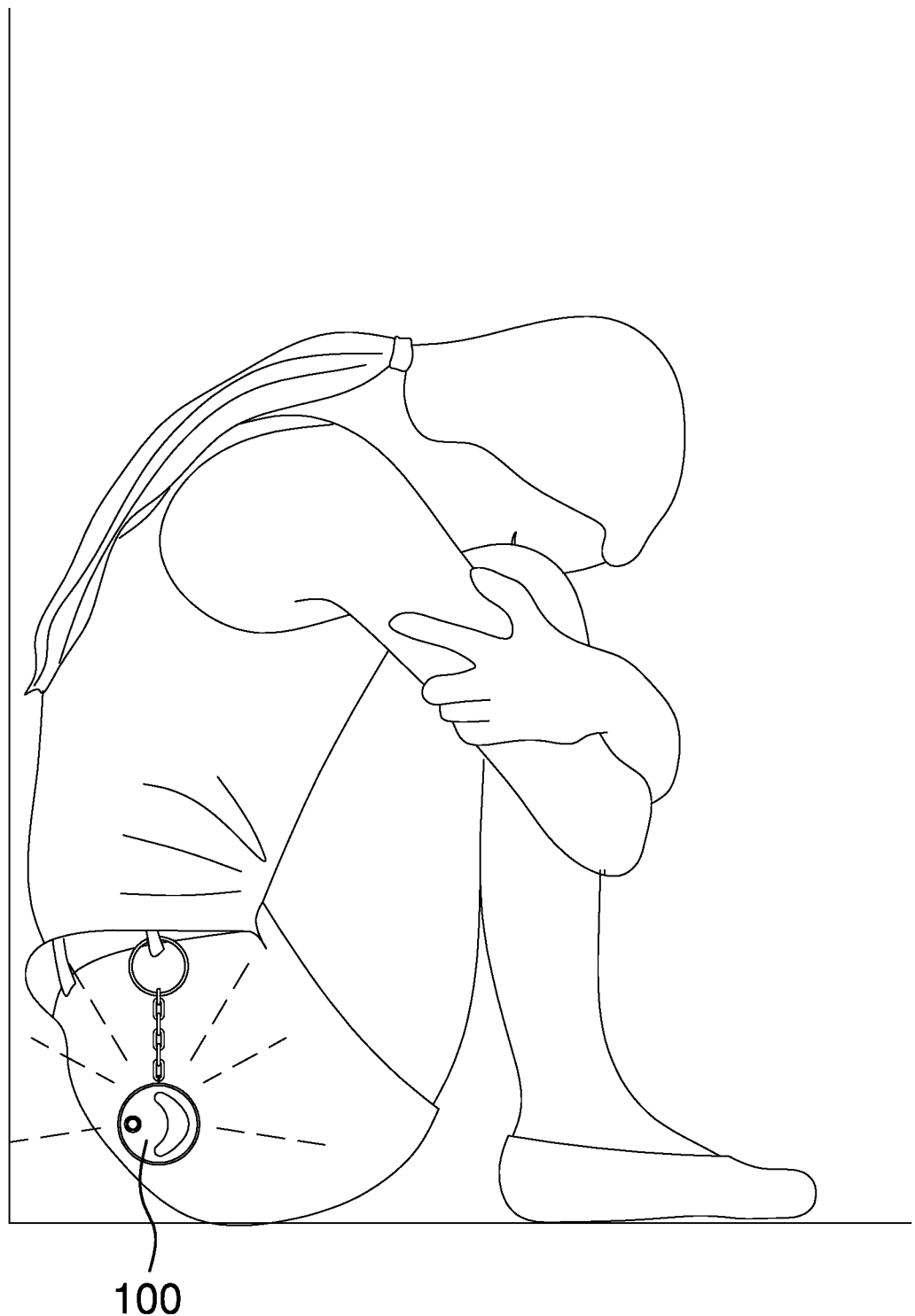
FIG. 4 is an in-use view of an embodiment of the disclosure.
Figure 5:
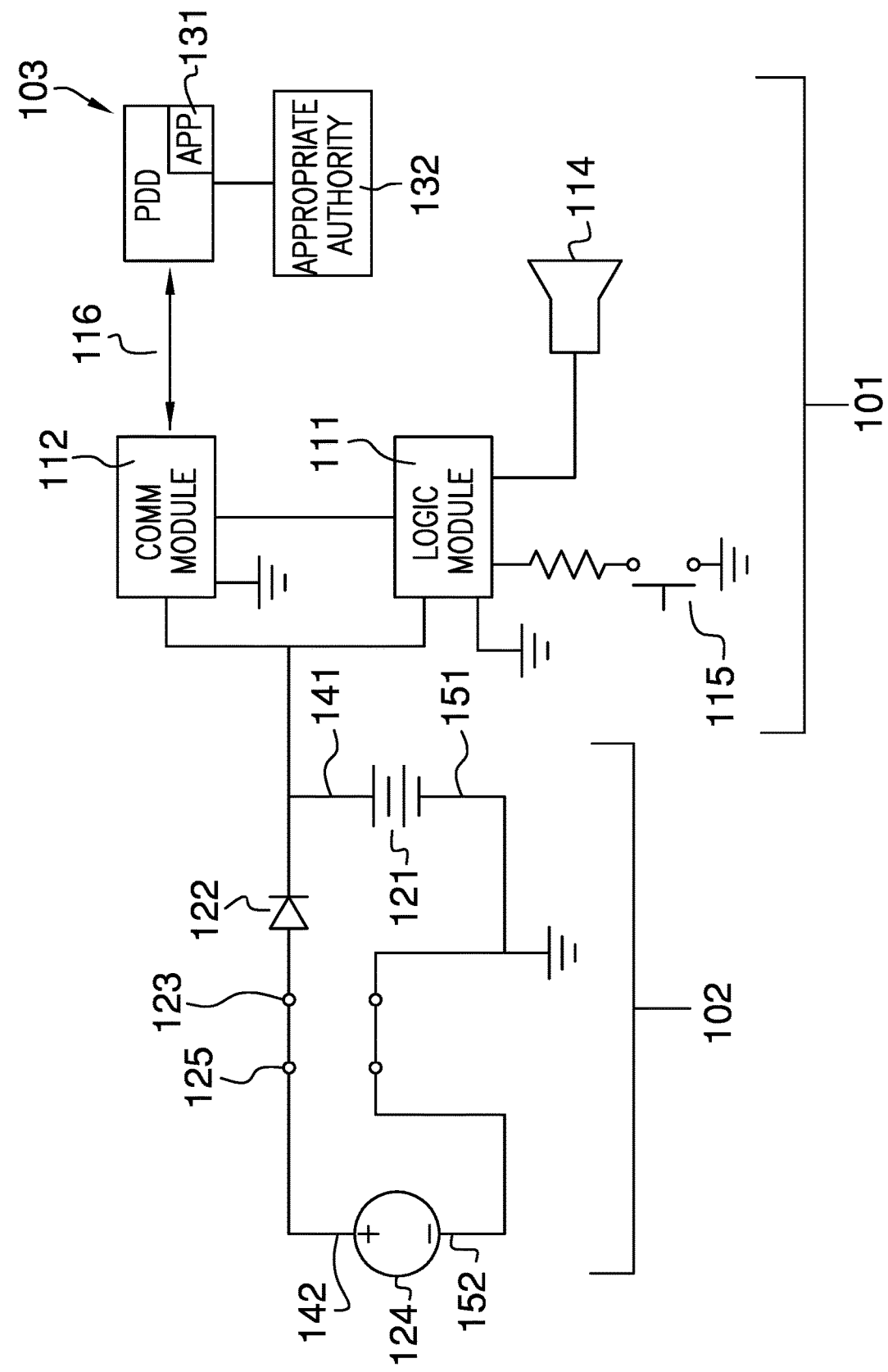
FIG. 5 is a block diagram or schematic view of an embodiment of the disclosure.

Detailed reference will now be made to one or more potential embodiments of the disclosure, which are illustrated in FIGS. 1 through 5.

The audio recording and playback keychain 100 (hereinafter invention) is a therapeutic device. The invention 100 is adapted for use with an end user. The invention 100 is an electronic device. The invention 100 is maintained in the custody of the end user. The invention 100 offers the end user audibly accessible messages of encouragement in times of the end user's need. The invention 100 comprises a control circuit 101, a power circuit 102, and a personal data device 103. The control circuit 101 stores and presents the audibly accessible messages for the end user's use. The personal data device 103 forms a wireless communication link with the control circuit 101. The personal data device 103 forms an interface between the control circuit 101 and an appropriate authority 132.

The control circuit 101 is an electric circuit. The control circuit 101 stores one or more audibly accessible messages. The control circuit 101 presents an audibly accessible message selected from one or more audibly accessible messages to the end user. The control circuit 101 forms a communication link with the personal data device 103. The control circuit 101 receives the one or more audibly accessible messages from the personal data device 103. An appropriate authority 132 selects the set of one or more audibly accessible messages that are transmitted to and maintained by the control circuit 101 through the personal data device 103. The control circuit 101 presents the audibly accessible message selected from one or more audibly accessible messages to the end user in a time of emotional need.

The control circuit 101 comprises a logic module 111, a communication module 112, a speaker 114, and an initiate switch 115. The logic module 111, the communication module 112, and the speaker 114, and the initiate switch 115 are electrically interconnected.

The logic module 111 is a readily and commercially available programmable electronic device that is used to manage, regulate, and operate the control circuit 101. The communication module 112 is a wireless electronic communication device that allows the logic module 111 to wirelessly communicate with a personal data device 103. The communication module 112 further comprises a wireless communication link 116 and the personal data device 103. The communication module 112 forms the wireless communication link 116 with the personal data device 103. The communication module 112 manages one or more direct messaging facilities that are transmitted over the wireless communication link 116 to the personal data device 103. The message contained in each direct messaging facility contains one or more audibly accessible messages intended to be presented to the end user.

The personal data device 103 is a programmable electrical device. The personal data device 103 further comprises an application 131. The personal data device 103 provides data management and communication services through one or more functions referred to as an application 131. The application is a set of logical operating instructions that are performed by the personal data device 103. The addition of an application 131 will provide increased functionality for the personal data device 103. This disclosure assumes that an application 131 exists for the purpose of interacting with the invention 100. Methods to design and implement an application on a personal data device 103 are well known and documented in the electrical arts. The application 131 of the personal data device 103 forms an interface with the control circuit 101. The personal data device 103 transmits operating instructions over the wireless communication link 116 to the control circuit 101. The communication module 112 receives the transmitted operating instructions and relays the received operating instructions to the logic module 111.

The speaker 114 is a transducer. The speaker 114 converts electric energy into audible sounds. The speaker 114 presents the audibly accessible message to the end user. The speaker 114 electrically connects to the logic module 111. The logic module controls the audible sounds announced by the speaker 114.

The initiate switch 115 electrically connects to the logic module 111. The logic module 111 monitors the initiate switch 115. The end user uses the initiate switch 115 to initiate the presentation of audibly accessible message selected from one or more audibly accessible messages.

The power circuit 102 is an electrical circuit. The power circuit 102 powers the operation of the control circuit 101. The power circuit 102 is an electrochemical device. The power circuit 102 converts chemical potential energy into the electrical energy required to power the control circuit 101. The control circuit 101 and the power circuit 102 are independently powered electric circuits. By independently powered is meant that the control circuit 101 can operate without an electrical connection to an external power source 124. The power circuit 102 comprises a battery 121, a diode 122, a charging port 123, and an external power source 124. The external power source 124 further comprises a charging plug 125. The battery 121 further comprises a first positive terminal 141 and a first negative terminal 151. The external power source 124 further comprises a second positive terminal 142 and a second negative terminal 152. The battery 121, the diode 122, the charging port 123, and the external power source 124 are electrically interconnected. 12

The battery 121 is an electrochemical device. The battery 121 converts chemical potential energy into the electrical energy used to power the power circuit 101. The battery 121 is a commercially available rechargeable battery 121. The chemical energy stored within the rechargeable battery 121 is renewed and restored through use of the charging port 123. The charging port 123 is an electrical circuit that reverses the polarity of the rechargeable battery 121 and provides the energy necessary to reverse the chemical processes that the rechargeable battery 121 initially used to generate the electrical energy. This reversal of the chemical process creates a chemical potential energy that will later be used by the rechargeable battery 121 to generate electricity.

The charging port 123 forms an electrical connection to an external power source 124 using a charging plug 125. The charging plug 125 forms a detachable electrical connection with the charging port 123. The charging port 123 receives electrical energy from the external power source 124 through the charging plug 125. The diode 122 is an electrical device that allows current to flow in only one direction. The diode 122 installs between the rechargeable battery 121 and the charging port 123 such that electricity will not flow from the first positive terminal 141 of the rechargeable battery 121 into the second positive terminal 142 of the external power source 124. In the first potential embodiment of the disclosure, the external power source 124, the charging plug 125, and the charging port 123 are compatible with USB power requirements.

The following definitions were used in this disclosure:

Announce: As used in this disclosure, to announce means to generate audible sounds over a transducer.

Application or App: As used in this disclosure, an application or app is a self-contained piece of software that is especially designed or downloaded for use with a personal data device.

Appropriate Authority: As used in this disclosure, an appropriate authority is a previously determined person or organization that is designated to send and receive alarm or other notification messages regarding a monitored system or activity.

Battery: As used in this disclosure, a battery is a chemical device consisting of one or more cells, in which chemical energy is converted into electricity and used as a source of power. Batteries are commonly defined with a positive terminal and a negative terminal.

Bluetooth: As used in this disclosure, Bluetooth is a standardized communication protocol that is used to wirelessly interconnect electronic devices.

Channel: As used in this disclosure, a channel is a previously determined frequency of electromagnetic radiation that is used for wireless communication. Wireless communication structures often designate a plurality of channels which allows users to "change the channel" when a previously specified channel is experiencing some form of interference.

Commercially Provided And Publicly Available Cellular Wireless Network: As used in this disclosure, a commercially provided and publicly available cellular wireless network refers to subscription based publicly available wireless network commonly used to provide wireless communication access for personal data devices. The commercially provided and publicly available cellular wireless network will typically provide voice communication, data communication services, and SMS and MMS messaging services. The commercially provided and publicly available cellular wireless network is commonly referred to as the cellular network. The commercially provided and publicly available cellular wireless network is abbreviated as the PPWN.

Communication Link: As used in this disclosure, a communication link refers to the structured exchange of data between two objects.

Control Circuit: As used in this disclosure, a control circuit is an electrical circuit that manages and regulates the behavior or operation of a device.

Custody: As used in this disclosure, custody refers to an object or person that is under the physical control or care of a custodian. The custodian is an appropriate authority responsible for the proper operation, appropriate use, or well-being of the object or person that is in custody.

Diode: As used in this disclosure, a diode is a two terminal semiconductor device that allows current flow in only one direction. The two terminals are called the anode and the cathode. Electric current is allowed to pass from the anode to the cathode.

Email: As used in this disclosure, email describes a communication between a sender and one or more receivers that is delivered through a network wherein the nodes of the network comprise a plurality of logical devices. An email will generally comprise a text based communication component.

External Power Source: As used in this disclosure, an external power source is a source of the energy that is externally provided to enable the operation of the present disclosure. Examples of external power sources include, but are not limited to, electrical power sources and compressed air sources.

Fob: As used in this disclosure, a fob is a container that: a) contains an electric circuit; and, b) is carried by a person as a domestic article.

GPS: As used in this disclosure, and depending on the context, GPS refers to: a) a system of navigational satellites that are used to determine the position, known as GPS coordinates, and velocity of a person or object; b) the system of navigational satellites referred to in the first definition that are used to synchronize to global time; or, c) an electronic device or that uses the system of navigational satellites referred to in the first definition to determine the position of a person or object. GPS is an acronym for Global Positioning System. Methods to determine the distance and direction between any two sets of GPS coordinates are well-known and documented in the navigational arts.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Messaging Facility: As used in this disclosure, a messaging facility is a previously determined formatting structure through which a text or image (referred to in this definition as text) based communication is transmitted for delivery. A messaging facility is selected from the group consisting of a traditional messaging facility, a direct messaging facility and a broadcast messaging facility. A traditional messaging facility includes the delivery of a physical object containing the text based communication. The direct messaging facility includes communications that are addressed to a previously identified group of recipients. The broadcast messaging facility includes communications that are transmitted without the prior identification of the intended group of recipients. An example of a traditional messaging facility includes, but is not limited to, postal delivery. Examples of a direct messaging facilities include, but are not limited to, email, audio based communications, and SMS messages. A social media service is an example of a broadcast messaging facility.

Microphone: As used in this disclosure, a microphone is a transducer that converts the energy from vibration into electrical energy. The sources of vibrations include, but are not limited to, acoustic energy.

PDD: As used in this disclosure, PDD is an acronym for personal data device.

Personal Data Device: As used in this disclosure, a personal data device is a handheld logical device that is used for managing personal information and communication. Examples of personal data device include, but are not limited to, cellular phones, tablets, and smartphones.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

PPWN: As used in this disclosure, the PPWN is an acronym for publicly provided wireless network. The PPWN refers to a commercially provided and publicly available cellular wireless network.

Present: As used in this disclosure, to present means to bring an object, image, or concept to the attention of an individual.

SMS: As used in this disclosure, SMS is an abbreviation for short message service. The short message service is a service that is often provided with the cellular services that support personal data devices. Specifically, the SMS allows for the exchange of written messages between personal data devices. The SMS is commonly referred to as text messaging. A common enhancement of SMS is the inclusion of the delivery of multimedia services. This enhanced service is often referred to as Multimedia Media Services which is abbreviated as MMS.

Speaker: As used in this disclosure, a speaker is an electrical transducer that converts an electrical signal into an audible sound.

Therapeutic: As used in this disclosure, therapeutic is an adjective that refers to a medical, ameliorative, or hygienic substance, process, procedure, or device.

Transducer: As used in this disclosure, a transducer is a device that converts a physical quantity, such as pressure or brightness into an electrical signal or a device that converts an electrical signal into a physical quantity.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors. A USB cable refers to a cable that: 1) is terminated with USB connectors; and, 2) that meets the data transmission standards of the USB standard.

WiFi: As used in this disclosure, WiFi refers to the physical implementation of a collection of wireless electronic communication standards commonly referred to as IEEE 802.11x.

Wireless: As used in this disclosure, wireless is an adjective that is used to describe a communication link between two devices that does not require the use of physical cabling.

Wireless Communication Link: As used in this disclosure, a wireless communication link is a previously determined channel that is used to wirelessly exchange information between one or more transceivers.

Wireless Communication Establishment Technology: As used in this disclosure, a wireless communication establishment technology refers to technology that establishes a wireless communication link between a first logical device and a second logical device. Usually, the operation of a wireless communication establishment technology is initiated by the push of a button.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An audio recording and playback keychain comprising a control circuit, a power circuit, and a personal data device;
    wherein the personal data device forms a wireless communication link with the control circuit;
    wherein the power circuit provides electric energy to the control circuit;
    wherein the audio recording and playback keychain is a therapeutic device adapted for use with an end user;
    wherein the audio recording and playback keychain is maintained in the custody of the end user;
    wherein the audio recording and playback keychain offers the end user audibly accessible messages of encouragement in times of the end user's need;
    wherein the control circuit stores and presents the audibly accessible messages for the end user's use;
    wherein the personal data device forms an interface between the control circuit and an appropriate authority;
    wherein the control circuit is an electric circuit.

2. The audio recording and playback keychain according to claim 1
    wherein the control circuit stores one or more audibly accessible messages;
    wherein the control circuit presents an audibly accessible message selected from one or more audibly accessible messages to the end user;
    wherein the control circuit forms a communication link with the personal data device;
    wherein the control circuit receives the one or more audibly accessible messages from the personal data device;
    wherein the appropriate authority selects the set of one or more audibly accessible messages that are transmitted to and maintained by the control circuit through the personal data device;
    wherein the control circuit presents the audibly accessible message selected from one or more audibly accessible messages to the end user in a time of emotional need.

3. The audio recording and playback keychain according to claim 2
    wherein the control circuit comprises a logic module, a communication module, a speaker, and an initiate switch;
    wherein the logic module, the communication module, and the speaker, and the initiate switch are electrically interconnected.

4. The audio recording and playback keychain according to claim 3
    wherein the logic module is a programmable electronic device;
    wherein the communication module is a wireless electronic communication device that allows the logic module to wirelessly communicate with the personal data device;
    wherein the communication module further comprises a wireless communication link;
    wherein the communication module forms the wireless communication link with the personal data device;
    wherein the logic module and the communication module manage one or more direct messaging facilities that are transmitted over the wireless communication link to the personal data device;
    wherein the message contained in each direct messaging facility contains one or more audibly accessible messages intended to be presented to the end user.

5. The audio recording and playback keychain according to claim 4
    wherein the speaker is a transducer;
    wherein the speaker converts electric energy into audible sounds;
    wherein the speaker presents the audible component of the selected audibly accessible message to the end user;
    wherein the speaker electrically connects to the logic module;
    wherein the logic module controls the audible sounds announced by the speaker.

6. The audio recording and playback keychain according to claim 5
    wherein the initiate switch electrically connects to the logic module;
    wherein the logic module monitors the initiate switch.

7. The audio recording and playback keychain according to claim 6
    wherein the power circuit is an electrical circuit;
    wherein the power circuit powers the operation of the control circuit;
    wherein the power circuit is an electrochemical device;
    wherein the power circuit converts chemical potential energy into the electrical energy required to power the control circuit.

8. The audio recording and playback keychain according to claim 7
    wherein the control circuit and the power circuit are independently powered electric circuits;

wherein by independently powered is meant that the control circuit can operate without an electrical connection to an external power source.

\* \* \* \* \*